(12) United States Patent
Kluemper et al.

(10) Patent No.: US 8,260,512 B2
(45) Date of Patent: Sep. 4, 2012

(54) SYSTEM AND METHOD FOR CONTROLLING LOCKUP CLUTCH ENGAGEMENT IN A TORQUE CONVERTER

(75) Inventors: Kevin Kluemper, Monrovia, IN (US); John Kresse, Martinsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 338 days.

(21) Appl. No.: 12/612,623

(22) Filed: Nov. 4, 2009

(65) Prior Publication Data
US 2010/0168973 A1 Jul. 1, 2010

Related U.S. Application Data

(60) Provisional application No. 61/111,058, filed on Nov. 4, 2008.

(51) Int. Cl.
*G06F 19/00* (2011.01)
(52) U.S. Cl. .......................... 701/67; 477/39

(58) Field of Classification Search ............... 701/67, 701/59, 84, 87; 477/166, 62, 169, 54, 63, 477/68, 92, 39, 57, 171
See application file for complete search history.

(56) References Cited

U.S. PATENT DOCUMENTS

| | | | |
|---|---|---|---|
| 2004/0162184 A1* | 8/2004 | Segawa et al. | 477/62 |
| 2004/0204290 A1* | 10/2004 | Ito | 477/175 |
| 2007/0005211 A1* | 1/2007 | Katsumata et al. | 701/67 |
| 2007/0142173 A1* | 6/2007 | Kawamura et al. | 477/156 |

* cited by examiner

*Primary Examiner* — Thomas G. Black
*Assistant Examiner* — Marthe Marc-Coleman
(74) *Attorney, Agent, or Firm* — Barnes & Thornburg LLP

(57) ABSTRACT

A torque converter has a pump that is rotatably driven by an internal combustion engine and that is fluidly coupled to a turbine, and a lockup clutch connected between pump and the turbine. Controlling engagement of the lockup clutch may include controlling the lockup clutch to an initial lockup clutch activation value, determining rotational speed of the pump, determining rotational speed of the turbine, and if the rotational speed of the turbine is greater than the rotational speed of the pump, increasing rotational speed of the engine until the rotational speed of the pump is within a threshold value of the rotational speed of the turbine followed by controlling the lockup clutch to full engagement.

20 Claims, 4 Drawing Sheets

SYSTEM AND METHOD FOR CONTROLLING LOCKUP CLUTCH ENGAGEMENT IN A TORQUE CONVERTER

CROSS-REFERENCE TO RELATED U.S. APPLICATION

This patent application claims the benefit of, and priority to, provisional patent application Ser. No. 61/111,058, filed Nov. 4, 2008, the disclosure of which is incorporated herein by reference.

FIELD OF THE INVENTION

The present invention relates generally to torque converters that serve as interfaces between internal combustion engines and automatic transmissions in mobile vehicles, and more specifically to the control of lockup clutches in such torque converters

BACKGROUND

Torque converters are commonly used as an interface between an internal combustion engine and a transmission having a number of automatically selectable gear ratios. Some torque converters include a so-called lockup clutch that is connected between the pump and turbine of the torque converter, and that is engaged under certain operating conditions to rigidly connect the pump and turbine together. It is desirable to control operation of the engine and of the torque converter during the lockup clutch engagement process to facilitate engagement of the lockup clutch.

SUMMARY

The present invention may comprise one or more of the features recited in the attached claims, and/or one or more of the following features and combinations thereof. With a torque converter having a pump that is rotatably driven by an internal combustion engine and that is fluidly coupled to a turbine, and a lockup clutch connected between pump and the turbine, a method for controlling engagement of the lockup clutch may comprise controlling the lockup clutch to an initial lockup clutch activation value, determining rotational speed of the pump, determining rotational speed of the turbine, and if the rotational speed of the turbine is greater than the rotational speed of the pump, increasing rotational speed of the engine until the rotational speed of the pump is within a first threshold value of the rotational speed of the turbine followed by controlling the lockup clutch to full engagement.

Controlling the lockup clutch to an initial lockup clutch activation value may comprise controlling the lockup clutch to an initial lockup clutch pressure. Controlling the lockup clutch to full engagement may comprise controlling the lockup clutch to a maximum lockup clutch pressure.

Increasing rotational speed of the engine until the rotational speed of the pump is within a first threshold value of the rotational speed of the turbine may comprise determining an engine speed increase rate, and increasing the rotational speed of the engine at the engine speed increase rate until rotational speed of the pump is within the first threshold value of the rotational speed of the turbine. Determining an engine speed increase rate may comprise determining an engine speed increase rate as a function of the rotational speed of the pump. Determining an engine speed increase rate may comprise determining an engine speed increase rate further as a function of the rotational speed of the turbine.

Increasing the rotational speed of the engine at the engine speed increase rate until the rotational speed of the pump is within a first threshold value of the rotational speed of the turbine may comprise incrementally increasing the rotational speed of the engine according to the engine speed increase rate, waiting for a time delay after incrementally increasing the rotational speed of the engine, determining the rotational speeds of the pump and the turbine after waiting for the time delay, determining whether a difference between the rotational speeds of the pump and the turbine determined after waiting for the time delay is less than or equal to the first threshold value, and repeating the steps of incrementally increasing the rotational speed of the engine, waiting for the time delay, determining the rotational speeds of the pump and the turbine and determining whether a difference between the rotational speeds of the pump and the turbine is less than or equal to the first threshold value until the difference between the rotational speeds of the pump and the turbine are less than or equal to the first threshold value. The method may further comprise controlling a pressure of the lockup clutch to force engagement of the lockup clutch if the difference between the rotational speeds of the pump and the turbine is not less than or equal to the first threshold value within a specified time duration after a first incremental increasing of the rotational speed of the engine.

The method may further comprise, when the rotational speed of the pump is within the first threshold value of the rotational speed of the turbine, limiting the rotational speed of the engine to a rotational speed that is within an offset value of the rotational speed of the turbine until the rotational speed of the pump is within a second threshold value of the rotational speed of the turbine that is less than the first threshold value, followed by controlling the lockup clutch to full engagement. The method of claim may further comprise controlling the lockup clutch to full engagement if the rotational speed of the pump is not within the second threshold value of the rotational speed of the turbine within a specified time duration after limiting the rotational speed of the engine to the rotational speed that is within an offset value of the rotational speed of the turbine.

A system for controlling engagement of a lockup clutch in a torque converter may comprise a torque converter turbine, a torque converter pump engaged with an output shaft of an internal combustion engine and fluidly coupled to the turbine, the lockup clutch connected between the pump and the turbine, a first sensor configured to produce a pump speed signal corresponding to a rotational speed of the pump, a second sensor configured to produce a turbine speed signal corresponding to a rotational speed of the turbine, and a first control circuit including a memory having instructions stored therein that are executable by the control circuit to control the lockup clutch to an initial lockup clutch activation value, to process the pump speed signal and the turbine speed signal, and if the rotational speed of the turbine is greater than the rotational speed of the pump to request an increase in rotational speed of the engine until the rotational speed of the pump is within a first threshold value of the rotational speed of the turbine followed by controlling the lockup clutch to full engagement.

The system may further comprise a second control circuit configured to control operation of a fuel system of the engine and configured to receive the request for an increase in rotational speed of the engine from the first control circuit. The second control circuit may include a memory having instructions stored therein that are executable by the second control circuit to increase rotational speed of the engine by controlling the fuel system in accordance with the request for an increase in rotational speed of the engine. The system may further comprise a data link established between the first and second control circuits. The first control circuit may be configured to send the request for an increase in rotational speed of the engine to the second control circuit via the data link.

The instructions stored in the memory of the first control circuit may include instructions that are executable by the first control circuit to request the increase in rotational speed of the engine until the rotational speed of the pump is within the first threshold value of the rotational speed of the turbine by determining an engine speed increase rate, and requesting the increase in rotational speed of the engine according to the engine speed increase rate. The instructions stored in the memory of the first control circuit may include instructions that are executable by the first control circuit to determine the engine speed increase rate by determining the engine speed increase rate as a function of the rotational speeds of the pump and the turbine.

The instructions stored in the memory of the first control circuit may include instructions that are executable by the first control circuit to request the increase in rotational speed of the engine by setting an engine speed request value to a current value of the rotational speed of the pump, incrementally increasing the engine speed request value, waiting for a time delay after incrementally increasing the engine speed request value according to the engine speed increase rate, determining the rotational speeds of the pump and the turbine after waiting for the time delay, determining whether a difference between the rotational speeds of the pump and the turbine determined after waiting for the time delay is less than or equal to the first threshold value, and repeating the steps of incrementally increasing the engine speed request value, waiting for the time delay, determining the rotational speeds of the pump and the turbine and determining whether a difference between the rotational speeds of the pump and the turbine is less than or equal to the first threshold value until the difference between the rotational speeds of the pump and the turbine are less than or equal to the first threshold value. The instructions stored in the memory of the first control circuit may further include instructions that are executable by the first control circuit to control pressure of the lockup clutch to force engagement of the lockup clutch regardless of the rotational speeds of the pump and turbine if the difference between the rotational speeds of the pump and the turbine is not less than or equal to the first threshold value within a specified time duration after a first incremental increasing of the engine speed request value.

The instructions stored in the memory of the first control circuit may further include instructions that are executable by the first control circuit to limit the rotational speed of the engine to a rotational speed that is within an offset value of the rotational speed of the turbine, when the rotational speed of the pump is within the first threshold value of the rotational speed of the turbine, until the rotational speed of the pump is within a second threshold value of the rotational speed of the turbine that is less than the first threshold value, followed by controlling the lockup clutch to full engagement. The instructions stored in the memory of the first control circuit may further include instructions that are executable by the first control circuit to control the lockup clutch to full engagement if the rotational speed of the pump is not within the second threshold value of the rotational speed of the turbine within a specified time duration after limiting the rotational speed of the engine to the rotational speed that is within an offset value of the rotational speed of the turbine.

The instructions stored in the memory of the first control circuit may include instructions that are executable by the first control circuit to control the lockup clutch to an initial lockup clutch activation value by controlling the lockup clutch to an initial lockup clutch pressure, and to control the lockup clutch to full engagement by controlling the lockup clutch to a maximum lockup clutch pressure.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
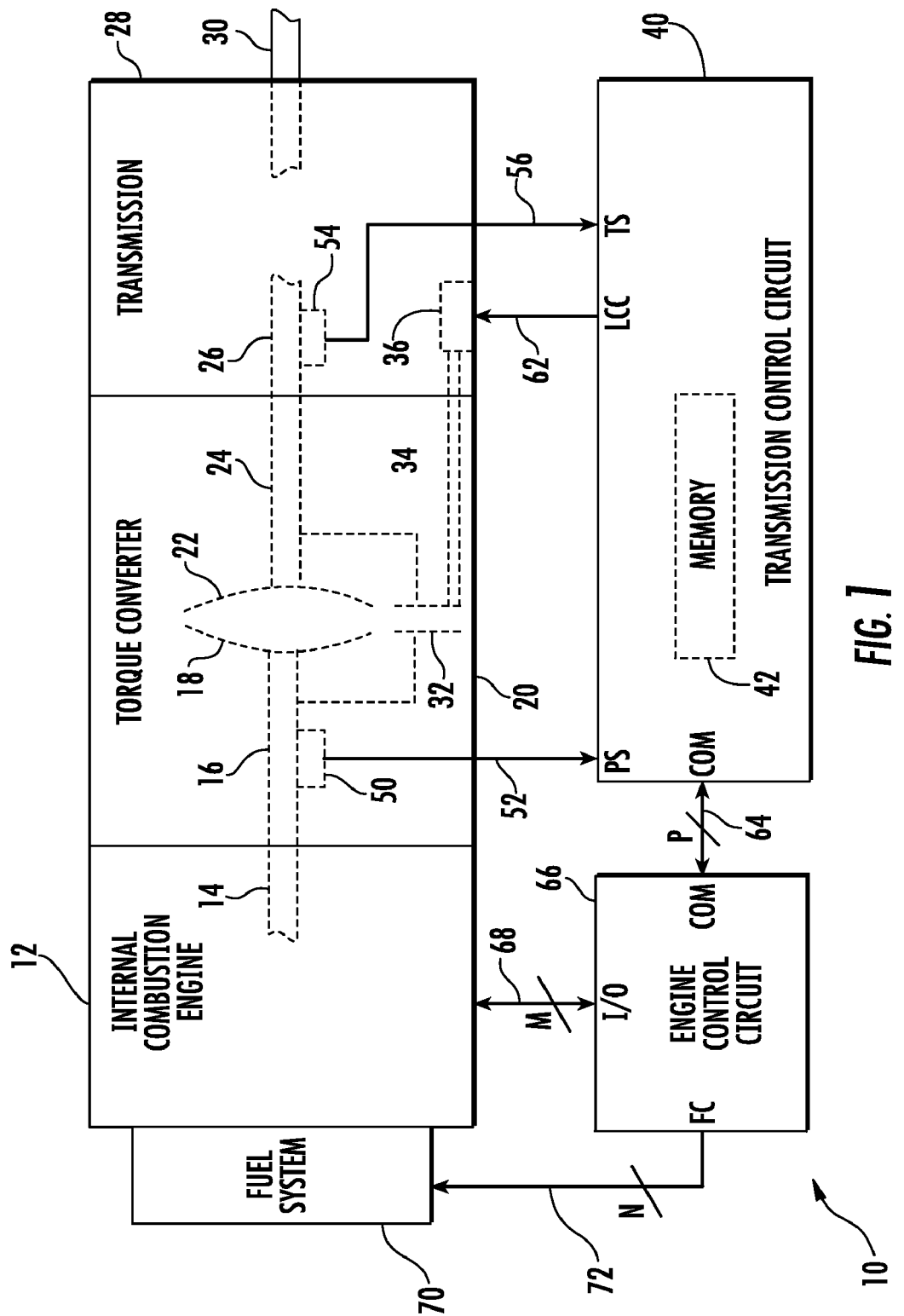
FIG. 1 is a block diagram and schematic view of one illustrative embodiment of a system for controlling lock up clutch engagement in a torque converter.

Referring now to FIG. 1, a block diagram and schematic view of one illustrative embodiment of a system 10 for controlling operation of a lock up clutch in a torque converter is shown. In the illustrated embodiment, the system 10 includes an internal combustion engine 12 that is configured to rotatably drive an output shaft 14 that is coupled to an input or pump shaft 16 of a conventional torque converter 20. The input or pump shaft 16 is attached to an impeller or pump 18 that is rotatably driven by the output shaft 14 of the engine 12. The torque converter 20 further includes a turbine 22 that is attached to a turbine shaft 24, and the turbine shaft 24 is coupled to, or integral with, a rotatable input shaft 26 of a transmission 28. The transmission 28 is conventional and includes a number of automatically selected gear ratios. An output shaft 30 of the transmission is coupled to, and rotatably drives, a number of wheels (not shown) of a vehicle carrying the engine 12, torque converter 20 and transmission 28.

A conventional lockup clutch 32 is connected between the pump 18 and the turbine 22, and the lockup clutch 32 is fluidly coupled to a fluid actuator 36 via a fluid passageway 34. The operation of the torque converter 20 is conventional in that the torque converter 20 is operable in a so-called "torque converter" mode during certain operating conditions such as vehicle launch, low speed and certain gear shifting conditions. In the torque converter mode, the lockup clutch 32 is disengaged and the pump 18 rotates at the rotational speed of the engine output shaft 14 while the turbine 22 is rotatably actuated by the pump 18 through a fluid (not shown) interposed between the pump 18 and the turbine 22. In this operational mode, torque multiplication occurs through the fluid coupling between the pump 18 and the turbine 22 such that the turbine shaft 24 is exposed to more drive torque than is being supplied by the engine 12, as is known in the art. The torque converter 20 is alternatively operable in a so-called "lockup" mode during other operating conditions, such as when certain gear ratios of the transmission 28 are engaged. In the lockup mode, the lockup clutch 32 is engaged and the pump 18 is thereby secured to directly to the turbine 22 so that the engine output shaft 14 is directly coupled to the input shaft 26 of the transmission 28, as is also known in the art.

The system 10 further includes a transmission control circuit 40 that includes a memory unit 42. The transmission control circuit 40 is illustratively microprocessor-based, and the memory unit 42 generally includes instructions stored therein that are executable by the transmission control circuit 40 to control operation of the torque converter 20 and the transmission 28. It will be understood, however, that this disclosure contemplates other embodiments in which the transmission control circuit 40 is not microprocessor-based, but is configured to control operation of the torque converter 20 and/or transmission 28 based on one or more sets of hardwired instructions and/or software instructions stored in the memory unit 42.

In the system 10 illustrated in FIG. 1, the torque converter 20 and the transmission 28 each include one or more sensors configured to produce sensor signals that are indicative of one or more operating states of the torque converter 20 and/or the transmission 28. For example, the torque converter 20 includes the conventional speed sensor 50 that is positioned and configured to produce a speed signal corresponding to the rotational speed of the torque converter pump shaft 16 (which is also the rotational speed of the output shaft 14 of the engine 12). The speed sensor 50 is electrically connected to a pump speed input, PS, of the transmission control circuit 40 via a signal path 52, and the transmission control circuit 40 is operable to process the speed signal produced by the speed sensor 50 in a conventional manner to determine the rotational speed of the pump shaft 16. The transmission 28 further includes a second speed sensor 54 that is positioned and configured to produce a speed signal corresponding to the rotational speed of the input shaft 26 of the transmission 28. The input shaft 26 of the transmission 28 is directly coupled to, or integral with, the turbine shaft 24, and the speed sensor 54 may alternatively be positioned and configured to produce a speed signal corresponding to the rotational speed of the turbine shaft 24. In any case, the speed sensor 54 may be conventional, and is electrically connected to a turbine speed input, TS, of the transmission control circuit 40 via a signal path 56. The transmission control circuit 40 is configured to process the speed signal produced by the speed signal 54 in a conventional manner to determine the rotational speed of the turbine shaft 24/input shaft 26 of the transmission 28.

In the illustrated embodiment, the transmission 28 further includes one or more actuators configured to control various operations within the torque converter 20 and/or transmission 28. For example, the transmission 28 includes an actuator 36 that is electrically connected to a lockup clutch command output, LCC, of the transmission control circuit 40 via a signal path 62. In the illustrated embodiment, the actuator 36 is responsive to the lockup clutch command signal, LCC, produced by the transmission control circuit 40 on the signal path 62 to control the pressure of fluid within the fluid passageway 34, and thus the actuating pressure supplied to the lockup clutch 32. Illustratively, the actuator 36 may be provided in the form of a conventional charge pump fluidly coupled to a source of fluid, e.g., transmission oil, although this disclosure contemplates other embodiments in which the actuator may alternatively be provided in the form of a conventional valve, pump or the like, that is fluidly coupled to a source of fluid, e.g., transmission oil, or a conventional electro-mechanical, e.g. variable torque-producing, device.

In the illustrated embodiment, the system 10 further includes an engine control circuit 66 having an input/output port (I/O) that is electrically coupled to the engine 12 via a number, M, of signal paths, wherein M may be any positive integer. The engine control circuit 66 may be conventional, and is operable to control and manage the overall operation of the engine 12. For example, the engine 12 includes a conventional fuel system 70 which is electrically connected to a fuel command output, FC, of the engine control circuit 66 via a number, N, of signal paths wherein N may be any positive integer. The engine control circuit 66 is operable in a conventional manner to produce fueling commands as a function of a number of engine operating conditions, and to control the fuel system 70 via the fueling commands. The fuel system is responsive to the fuel commands produced by the engine control circuit 66 to supply fuel to the engine 12 in a conventional manner.

The engine control circuit 66 further includes a communication port, COM that is electrically connected to a similar communication port, COM, of the transmission control circuit 40 via a number, P, of signal paths 64, wherein P may be any positive integer. The one or more signal paths 64 are typically referred to collectively as a data link. Generally, the engine control circuit 66 and the transmission control circuit 40 are operable to share information via the one or more signal paths 64 in a conventional manner. In one embodiment, for example, the engine control circuit 66 and transmission control circuit 40 are operable to share information via the one or more signal paths 64 in the form of one or more messages accordance with a society of automotive engineers (SAE) J-1939 communications protocol, although this disclosure contemplates other embodiments in which the engine control circuit 66 and the transmission control circuit 40 are operable to share information via the one or more signal paths 64 in accordance with one or more other conventional communication protocols.

As it relates to this disclosure, the transmission control circuit 40 is operable to receive certain operating information relating to operation of the engine 12 from the engine control circuit 66 via the one or more signal paths 64 in a conventional manner. For example, the engine control circuit 66 is configured in a conventional manner to determine the instantaneous output torque produced by the engine 12, and in the illustrated embodiment the engine control circuit 66 is operable to supply the instantaneous engine output torque information to the transmission control circuit 40 via the one or more signal paths 64, such as in the form of a message that the transmission control circuit 40 may process to determine a corresponding engine output torque value. As another example, the engine control circuit 66 is operable in a conventional manner to determine the rotational speed of the engine output shaft 14, and in one embodiment the engine control circuit 66 is operable to supply the engine rotational speed information to the transmission control circuit 40 via the one or more signal paths 64. In this embodiment, the speed sensor 50 described hereinabove is not necessary, and may be omitted or otherwise be unused. Alternatively, the transmission control circuit 40 may be configured to determine the rotational speed of the engine 12 using both the signal produced by the sensor 50 and the engine rotational speed information supplied by the engine control circuit 66 via the one more signal paths 64.

Figure 2A:
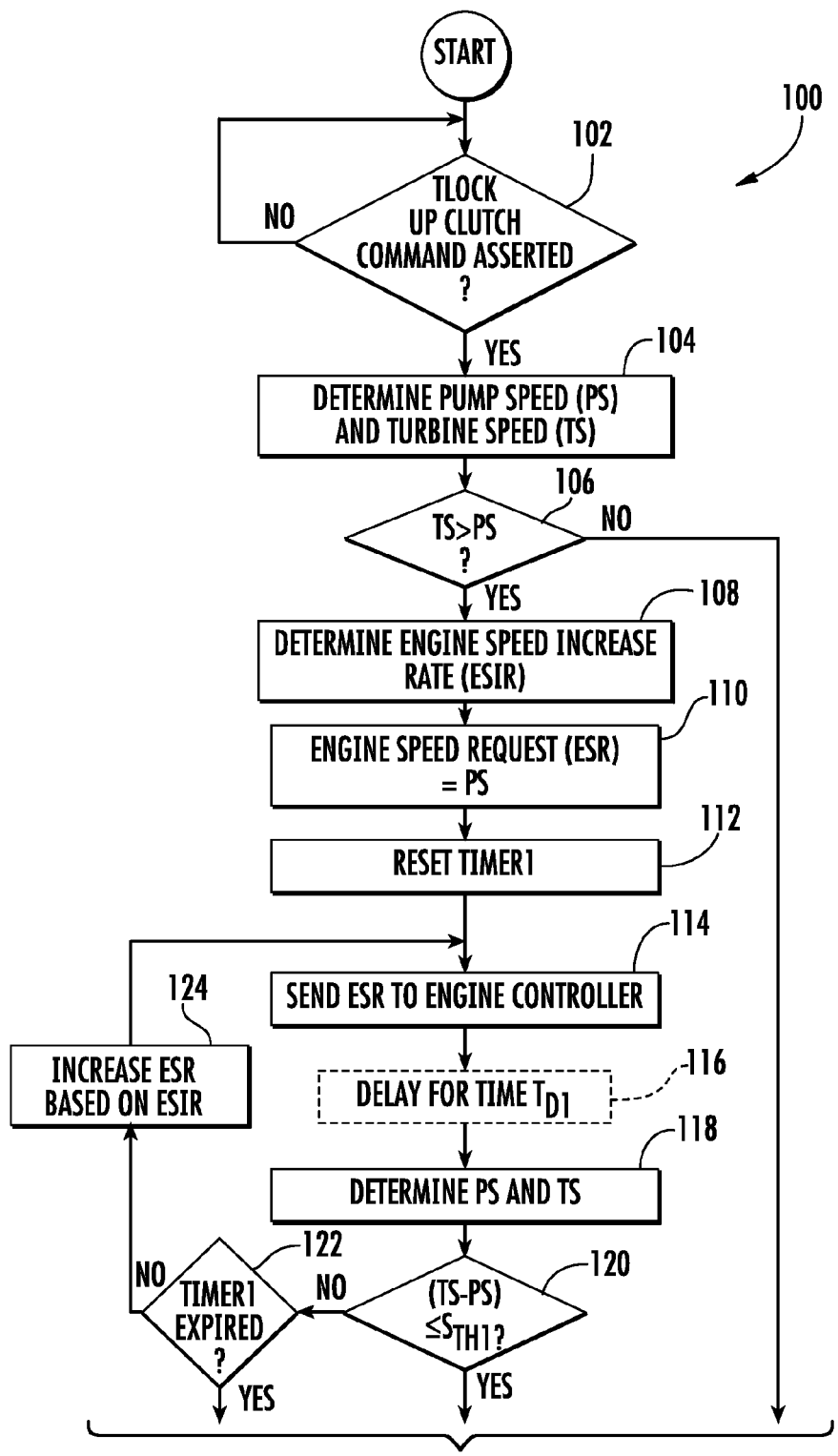
FIGS. 2A and 2B depict a flowchart of one illustrative embodiment of a process for controlling lockup clutch engagement in a torque converter.
Figure 3:
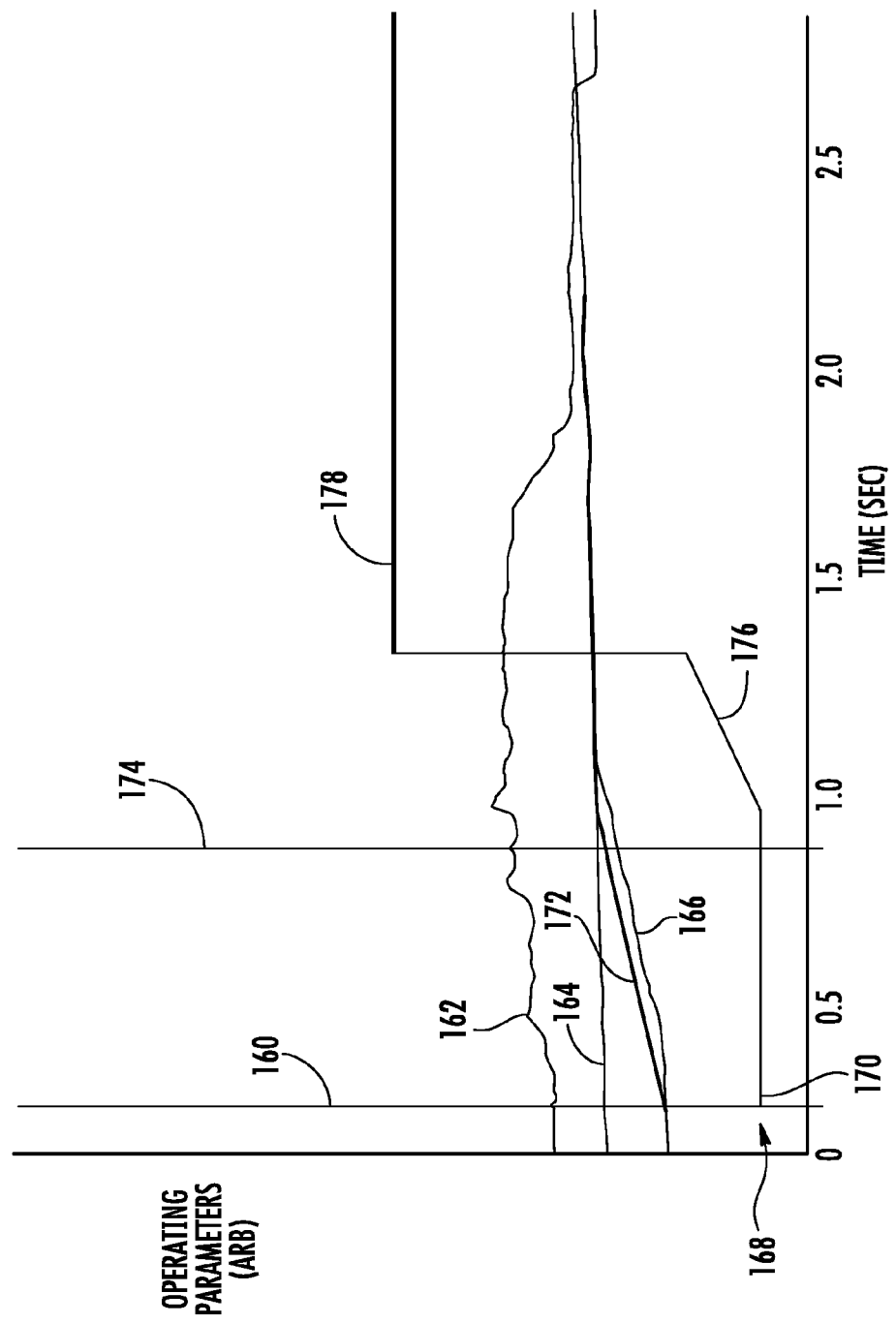
FIG. 3 is a plot of a number of operating parameters associated with lock up clutch operation during the lockup clutch engagement process of FIGS. 2A and 2B.

Referring now to FIG. 2A, a flow chart is shown of one illustrative embodiment of a process 100 for controlling operation of the lockup clutch 32. The process 100 is illustratively stored in the memory unit 42 of the transmission control circuit 40 in the form of one or more sets of instructions that are executable by the transmission control circuit 40 to control operation of the lockup clutch 42. The process 100 will be described with the aid of the plot of FIG. 3, which shows a number of engine 12 and torque converter 20 operating parameters (arbitrary scale) over time (seconds). In particular, the plot of FIG. 3 shows engine output torque 162 (e.g., engine output torque values supplied to the transmission control circuit 40 by the engine control circuit 66), turbine speed 164 (e.g., produced by the speed sensor 54), engine (pump shaft) speed 166 (e.g., produced by the speed sensor 50), and lockup clutch pressure 168. Other signals and/or features are also shown in the plot of FIG. 3, and such other signals and/or signal features will be described hereinafter within the context of the process 100.

The process 100 begins at step 102 where the transmission control circuit 40 is operable to determine whether the lockup clutch command, LCC, has been asserted, i.e., is active. In the illustrated embodiment, the transmission control circuit 40 is operable to produce the lockup clutch command, LCC, according to one or more sets of instructions stored in the memory 42, and therefore has knowledge of the state of the lockup clutch command, LCC. Referring again to FIG. 3, lockup clutch pressure is represented by the signal 168, and the lockup clutch pressure 168 generally follows the lockup clutch command, LCC. The signal 168 thus represents the lockup clutch command, LCC, and the signal 168 will be used herein to illustrate and described the operation of LCC. In any case, the lockup clutch command 168 illustrated in FIG. 3 includes an initial lockup clutch pressure or initial lockup clutch activation value 170 that is initially commanded by the transmission control circuit 40 when the lockup clutch command, LCC, is asserted. As illustrated in FIG. 3, the lockup clutch pressure 168 is then maintained at the initial lockup clutch pressure or activation value 170 and is thereafter increased to a maximum lockup clutch pressure value 178 to achieve engagement of the lockup clutch 32 as will be described hereinafter.

Returning again to the process 100 of FIG. 2A, if the transmission control circuit 40 determines at step 102 that the lockup clutch command, LCC, has not been asserted, the process 100 loops back to step 102. If, on the other hand, the transmission control circuit 40 determines at step 102 that the lockup clutch command, LCC, has been asserted, execution of the process 100 advances to step 104 where the transmission control circuit 40 is operable to determine the rotational speed, PS, of the pump 18, e.g., via the speed signal produced by the speed sensor 50, and the rotational speed, TS, of the turbine 22, e.g., via the speed signal produced by the speed sensor 54.

Following step 104, the process 100 advances to step 106 where the control circuit 40 is operable to compare the turbine rotational speed, TS, to the pump rotational speed, PS. If the control circuit 40 determines at step 106 that the turbine rotational speed, TS, is greater that the pump rotational speed, PS, the control circuit 40 is operable to controllably increase the rotational speed, PS, of the pump 18 to the rotational speed, TS, of the turbine 22, as will be described in detail hereinafter, until a synchronous or near-synchronous speed between the two is achieved, followed by controlling the lockup clutch 32 to full engagement. Illustratively, the control circuit 40 is operable to controllably increase the rotational speed, PS, of the pump 18 by periodically sending a request to the engine control circuit 66 to increase the rotational speed of the engine, e.g., via the data link 64. The engine control circuit 66 is responsive to the engine speed increase requests sent by the control circuit 40 to control the fueling system 70, e.g., via appropriate fuel commands, FC, to increase fueling to the engine 12 to thereby increase the rotational speed of the engine 12. In one illustrative embodiment, the control circuit 40 is operable to compute the engine speed increase requests by computing an engine speed increase rate, ESIR, and then by periodically sending the current engine speed increase rate value to the engine control circuit 66. In the illustrated embodiment, for example, the process 100 advances from the "YES" branch of step 106 to step 108 where the control circuit 40 is operable to determine the engine speed increase rate, ESIR.

In one illustrative embodiment, the control circuit 40 is operable to execute step 108 by determining the engine speed increase rate, ESIR, as a linear function of the rotational speed, PS, of the pump 18 and the rotational speed, TS, of the turbine 22 as well as a time duration between the current time and that at which synchronous speed (PS=TS) or near-synchronous speed is achieved. In this embodiment, the time duration may be constant or may vary as a magnitude of the difference between PS and TS. In alternate embodiments, the engine speed increase rate, ESIR, may be computed as a non-linear or piece-wise linear function of PS, TS and the time duration between the current time and that at which synchronous speed is achieved, or may be computed as a linear, non-linear or piecewise function of more or fewer variables. In any case, the process 100 advances from step 108 to step 110 where the control circuit 40 is operable to set an engine speed request value, ESR, to the current value of the rotational speed, PS, of the pump 18. Thereafter at step 112, the control circuit 40 is operable to reset a first timer, TIMER1.

Following step 112, the transmission control circuit 40 is operable at step 114 to send the current engine speed request value, ESR, to the engine control circuit 66, e.g., via the data link 64. Following step 114, the process 100 may (but need not) include a step 116 as shown by dashed-line representation. If included, the control circuit 40 is operable at step 116 to delay for a time period $T_{D1}$, where $T_{D1}$ may correspond to any fixed or variable time period. Following step 116, or following step 114 in embodiments of the process 100 that do not include step 116, the control circuit 40 is operable at step 118 to again determine the rotational speed, PS, of the pump 18 and the rotational speed, TS, of the turbine 22. Following step 118, the control circuit 40 is operable at step 120 to determine whether a difference between TS and PS is less than or equal to a threshold speed value, $S_{TH1}$, according to the equation $(TS-PS) \leq S_{TH}$. The speed threshold value, $S_{TH1}$, represents the error between the synchronous speeds (PS=TS) of the pump 18 and the turbine 22. $S_{TH1}$ may be a fixed value or may alternatively vary as a function of PS and/or TS, e.g., as a function of (PS−TS). In any case, if the control circuit 40 determines at step 120 that (TS−PS) is not less than or equal to $S_{TH1}$, the process 100 advances to step 122 where the control circuit 40 is operable to determine whether the first timer, TIMER1, has expired. If so, this typically means that the engine control circuit 66 is not responding to the engine speed requests, ESR, being sent by the transmission control circuit 40. In such cases, the process 100 advances to step 126 where the transmission control circuit 40 is operable in a conventional manner to control the lockup clutch command, LCC, such that pressure applied to the lockup clutch 32 forces the rotational speed of the pump 18 toward that of the turbine 22 until engagement of the lockup clutch 32 can eventually occur. The expiration time of the first tinier, TIMER1, is therefore typically set to a time value beyond which control of the pump speed, PS, to within $S_{TH1}$ of the turbine speed, TS, is not likely to occur.

If at step 122 the transmission control circuit 40 determines that the first timer, TIMER1, has not expired, execution of the process 100 advances to step 124 where the transmission control circuit is operable to increase the engine speed request value, ESR, based on the engine speed increase rate, ESIR. In one illustrative embodiment, the control circuit 40 is operable to set the initial value of ESIR to the rotational speed, PS, of the pump 18 at step 108, and to thereafter continually solve ESIR as a function of elapsed time. In this embodiment, the control circuit 40 is operable to execute step 124 by setting ESR equal to the current value of ESIR. In one alternative embodiment, the control circuit 40 is operable to solve ESIR determined at step 108 as a function of elapsed time, and in this embodiment ESIR thus corresponds to an incremental speed value that the control circuit 40 adds to the current value of ESR each time step 124 is executed. In other embodiments, ESIR may be a multiplier, ratio or other mathematical function that the control circuit 40 mathematically combines with ESR at step 124 to increase the current value of ESR. In still other alternative embodiments, ESR and/or ESIR may be stored in the memory unit 42 in the form of a graph, chart or table, and conventional extrapolation, interpolation and/or other mathematical functions may be used at step 124 to determine the increased ESR value. In any case, the process 100 loops from step 124 back to step 114.

The steps 114-124 of the process 100 form a loop that is executed several times by the control circuit 40 to controllably increase the rotational speed of the engine 12, and thus the rotational speed of the pump 18, toward the rotational speed of the turbine 22. Referring again to FIG. 3, the line 172 represents one illustrative example of the engine speed request value, ESR, which is repeatedly sent by the control circuit 40 to the engine control circuit 66. As described hereinabove, the engine control circuit 66 is responsive to receipt of ESR to correspondingly control the fuel system 70 to supply additional fuel to the engine 12 to raise or increase the rotational speed of the engine (and thereby the pump shaft 16) as shown in FIG. 3 by the signal 166. The vertical line 174 represents the point in time at which the rotational speed, PS, of the pump 18 is within the speed threshold, $S_{TH1}$, of the rotational speed, TS, of the turbine 22. During the time period between the time markers 160 and 174, it will be noted that the lockup clutch command 168 is maintained at the initial lockup clutch pressure or activation value 170.

Referring again to FIG. 2A, if the control circuit 40 determines at step 120 that (TS−PS)≦$S_{TH1}$, the process 100 advances to step 128 (FIG. 2B) where the control circuit 40 is operable to reset a second timer, TIMER2. Thereafter at step 130, the transmission control circuit 40 is operable to determine a current value, TS, of the rotational speed of the turbine 22, and then at step 132 the transmission control circuit 40 is operable to limit the engine speed request value, ESR, to within an offset value, $S_{OFF}$, of the current value, TS, of the rotational speed of the turbine 22, i.e., TS+/−$S_{OFF}$. Following step 132, the process 100 may (but need not) include a step 134 as shown by dashed-line representation. If included, the control circuit 40 is operable at step 134 to delay for a time period $T_{D2}$, where $T_{D2}$ may correspond to any fixed or variable time period and that may be the same as, or different from, $T_{D1}$. Following step 134, or following step 132 in embodiments of the process 100 that do not include step 134, the control circuit 40 is operable at step 136 to again determine the rotational speed, PS, of the pump 18 and the rotational speed, TS, of the turbine 22. Following step 136, the control circuit 40 is operable at step 138 to determine whether a difference between TS and PS is less than or equal to another threshold speed value, $S_{TH2}$, according to the equation (TS−PS)≦$S_{TH2}$. Like the speed threshold, $S_{TH1}$, the speed threshold value, $S_{TH2}$, represents the error between the synchronous speeds (PS=TS) of the pump 18 and the turbine 22, although illustratively $S_{TH2}$<$S_{TH1}$. $S_{TH2}$ may be a fixed value or may alternatively vary as a function of PS and/or TS, e.g., as a function of (PS−TS). In any case, if the control circuit 40 determines at step 138 that (TS−PS) is not less than or equal to $S_{TH2}$, the process 100 advances to step 142 where the control circuit 40 is operable to determine whether the second timer, TIMER2, has expired. If so, this typically means that the engine control circuit 66 is not responding to the engine speed requests, ESR, being sent by the transmission control circuit 40. In such cases, the process 100 advances to step 144 where the transmission control circuit 40 is operable to control the lockup clutch command, LCC, to increase the lockup clutch pressure from the initial lockup clutch pressure value 170 to the maximum lockup clutch pressure value 178 (see FIG. 3) such that resulting maximum pressure applied to the lockup clutch 32 forces engagement of the lockup clutch 32. Illustratively, the transmission control circuit 40 is operable at step 144 to abruptly increase LCC to $LCC_{MAX}$ to force engagement of the lockup clutch 32 even though PS may not be equal to, or be within $S_{OFF}$ of TS. The expiration time of the second timer, TIMER2, is therefore typically set to a time value beyond which control of the pump speed, PS, to within $S_{TH2}$ of the turbine speed, TS, is not likely to occur. If at step 142 the transmission control circuit 40 determines that the second timer, TIMER2, has not expired, execution of the process 100 loops back to step 130.

If at step 138 the transmission control circuit 40 determines that (TS−PS) is less than or equal to $S_{TH2}$, the process 100 advances to step 140 where the control circuit 40 is illustratively operable to increase the lockup clutch pressure from the initial lockup clutch pressure value 170 to the maximum lockup clutch pressure value 178 such that resulting maximum pressure applied to the lockup clutch 32 engages the lockup clutch 32. In one embodiment, the transmission control circuit is operable at step 140 to increase the lockup clutch pressure from the initial lockup clutch pressure value 170 to the maximum lockup clutch pressure value 178 after a time settling time, $T_S$. In the graphical example illustrated in FIG. 3, the settling time, $T_S$, is the time period between the time marker 174 and the point in time at which the lockup clutch pressure value reaches the maximum pressure value 178. During at least part of the settling time, $T_S$, the control circuit 40 may illustratively be operable to ramp the lockup clutch pressure value upwardly toward the maximum lockup clutch pressure 178 as shown in FIG. 3 by the ramped region 176 of the lockup clutch command 168. In alternative embodiments, the control circuit 40 may be operable to more slowly or more rapidly ramp the lockup clutch command 168 from the initial value 170 to the maximum value 178, or may alternatively still increase the lockup clutch command 168 from the initial value 170 to the maximum value 178 at any desired rate using any desired lockup clutch increase profile. In any case, the process 100 advances from step 126, from step 140 and from step 144 to step 146 where the control circuit 40 is operable to disable ESR such that the control circuit 40 no longer sends ESR to the engine control circuit 66. From step 146, and from the "NO" branch of step 106, the process 100 terminates.

Figure 2B:
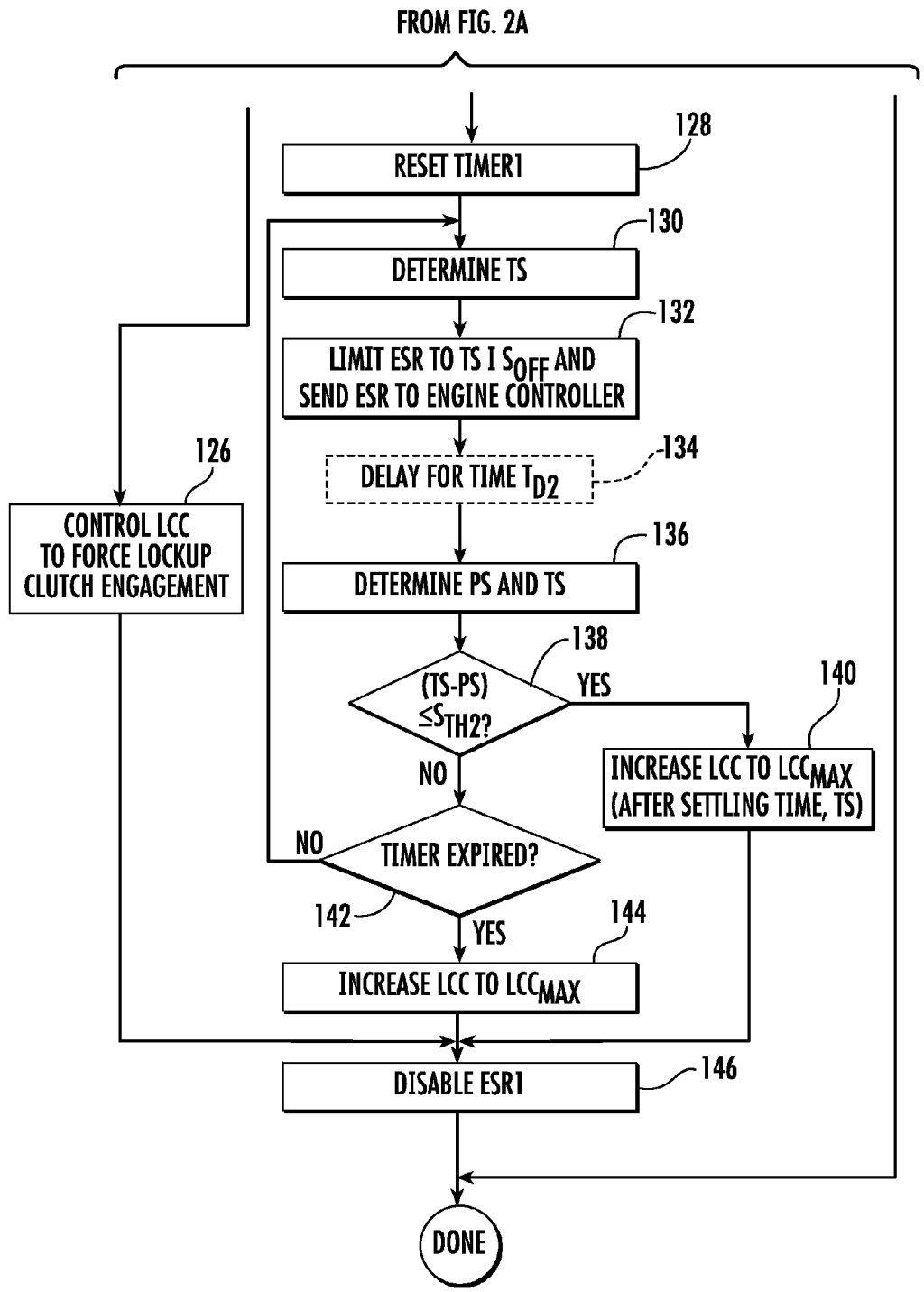

The steps 130-142 of the process 100 form a loop that is executed several times by the control circuit 40 to controllably maintain PS near TS, after increasing PS toward TS via steps 114-124, until engagement of the lockup clutch 32 can occur. During this time period following PS−TS≦$S_{TH1}$ the rotational speed of the turbine 22 may increase and step 132 therefore illustratively limits ESR to TS+/−$S_{OFF}$. Alternatively, step 132 may be modified to set ESR=TS, with the result being similar to step 132 as illustrated in FIG. 2B such that the engine speed request value, ESR, is held at or near the turbine speed, TS, following PS−TS≦STH1 until engagement of the lockup clutch 32 occurs.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. With a torque converter having a pump that is rotatably driven by an internal combustion engine and that is fluidly coupled to a turbine, and a lockup clutch connected between pump and the turbine, a method for controlling engagement of the lockup clutch, the method comprising:
controlling the lockup clutch to an initial lockup clutch activation value,
determining rotational speed of the pump,
determining rotational speed of the turbine, and
if the rotational speed of the turbine is greater than the rotational speed of the pump, increasing rotational speed of the engine until the rotational speed of the pump is within a first threshold value of the rotational speed of the turbine followed by controlling the lockup clutch to full engagement.

2. The method of claim 1 wherein controlling the lockup clutch to an initial lockup clutch activation value comprises controlling the lockup clutch to an initial lockup clutch pressure.

3. The method of claim 2 wherein controlling the lockup clutch to full engagement comprises controlling the lockup clutch to a maximum lockup clutch pressure.

4. The method of claim 1 wherein increasing rotational speed of the engine until the rotational speed of the pump is within a first threshold value of the rotational speed of the turbine comprises:
determining an engine speed increase rate, and
increasing the rotational speed of the engine at the engine speed increase rate until rotational speed of the pump is within the first threshold value of the rotational speed of the turbine.

5. The method of claim 4 wherein determining an engine speed increase rate comprises determining an engine speed increase rate as a function of the rotational speed of the pump.

6. The method of claim 5 wherein determining an engine speed increase rate comprises determining an engine speed increase rate further as a function of the rotational speed of the turbine.

7. The method of claim 4 wherein increasing the rotational speed of the engine at the engine speed increase rate until the rotational speed of the pump is within a first threshold value of the rotational speed of the turbine comprises:
incrementally increasing the rotational speed of the engine according to the engine speed increase rate,
waiting for a time delay after incrementally increasing the rotational speed of the engine,
determining the rotational speeds of the pump and the turbine after waiting for the time delay,
determining whether a difference between the rotational speeds of the pump and the turbine determined after waiting for the time delay is less than or equal to the first threshold value, and
repeating the steps of incrementally increasing the rotational speed of the engine, waiting for the time delay, determining the rotational speeds of the pump and the turbine and determining whether a difference between the rotational speeds of the pump and the turbine is less than or equal to the first threshold value until the difference between the rotational speeds of the pump and the turbine are less than or equal to the first threshold value.

8. The method of claim 7 further comprising controlling a pressure of the lockup clutch to force engagement of the lockup clutch if the difference between the rotational speeds of the pump and the turbine is not less than or equal to the first threshold value within a specified time duration after a first incremental increasing of the rotational speed of the engine.

9. The method of claim 1 further comprising, when the rotational speed of the pump is within the first threshold value of the rotational speed of the turbine, limiting the rotational speed of the engine to a rotational speed that is within an offset value of the rotational speed of the turbine until the rotational speed of the pump is within a second threshold value of the rotational speed of the turbine that is less than the first threshold value, followed by controlling the lockup clutch to full engagement.

10. The method of claim 9 further comprising controlling the lockup clutch to full engagement if the rotational speed of the pump is not within the second threshold value of the rotational speed of the turbine within a specified time duration after limiting the rotational speed of the engine to the rotational speed that is within an offset value of the rotational speed of the turbine.

11. A system for controlling engagement of a lockup clutch in a torque converter, comprising:
a torque converter turbine,
a torque converter pump engaged with an output shaft of an internal combustion engine and fluidly coupled to the turbine, the lockup clutch connected between the pump and the turbine,
a first sensor configured to produce a pump speed signal corresponding to a rotational speed of the pump,
a second sensor configured to produce a turbine speed signal corresponding to a rotational speed of the turbine, and
a first control circuit including a memory having instructions stored therein that are executable by the control circuit to control the lockup clutch to an initial lockup clutch activation value, to process the pump speed signal and the turbine speed signal, and if the rotational speed of the turbine is greater than the rotational speed of the pump to request an increase in rotational speed of the engine until the rotational speed of the pump is within a first threshold value of the rotational speed of the turbine followed by controlling the lockup clutch to full engagement.

12. The system of claim 11 further comprising a second control circuit configured to control operation of a fuel system of the engine and configured to receive the request for an increase in rotational speed of the engine from the first control circuit, the second control circuit including a memory having instructions stored therein that are executable by the second control circuit to increase rotational speed of the engine by controlling the fuel system in accordance with the request for an increase in rotational speed of the engine.

13. The system of claim 12 further comprising a data link established between the first and second control circuits, wherein the first control circuit is configured to send the request for an increase in rotational speed of the engine to the second control circuit via the data link.

14. The system of claim 11 wherein the instructions stored in the memory of the first control circuit include instructions that are executable by the first control circuit to request the increase in rotational speed of the engine until the rotational speed of the pump is within the first threshold value of the rotational speed of the turbine by determining an engine speed increase rate, and requesting the increase in rotational speed of the engine according to the engine speed increase rate.

15. The system of claim 14 wherein the instructions stored in the memory of the first control circuit include instructions that are executable by the first control circuit to determine the engine speed increase rate by determining the engine speed increase rate as a function of the rotational speeds of the pump and the turbine.

16. The system of claim 14 wherein the instructions stored in the memory of the first control circuit include instructions that are executable by the first control circuit to request the increase in rotational speed of the engine by setting an engine speed request value to a current value of the rotational speed of the pump, incrementally increasing the engine speed request value, waiting for a time delay after incrementally increasing the engine speed request value according to the engine speed increase rate, determining the rotational speeds of the pump and the turbine after waiting for the time delay, determining whether a difference between the rotational speeds of the pump and the turbine determined after waiting for the time delay is less than or equal to the first threshold value, and repeating the steps of incrementally increasing the engine speed request value, waiting for the time delay, determining the rotational speeds of the pump and the turbine and determining whether a difference between the rotational speeds of the pump and the turbine is less than or equal to the first threshold value until the difference between the rotational speeds of the pump and the turbine are less than or equal to the first threshold value.

17. The system of claim 16 wherein the instructions stored in the memory of the first control circuit further include instructions that are executable by the first control circuit to control pressure of the lockup clutch to force engagement of the lockup clutch if the difference between the rotational speeds of the pump and the turbine is not less than or equal to the first threshold value within a specified time duration after a first incremental increasing of the engine speed request value.

18. The system of claim 11 wherein the instructions stored in the memory of the first control circuit further include instructions that are executable by the first control circuit to limit the rotational speed of the engine to a rotational speed that is within an offset value of the rotational speed of the turbine, when the rotational speed of the pump is within the first threshold value of the rotational speed of the turbine, until the rotational speed of the pump is within a second threshold value of the rotational speed of the turbine that is less than the first threshold value, followed by controlling the lockup clutch to full engagement.

19. The system of claim 18 wherein the instructions stored in the memory of the first control circuit further include instructions that are executable by the first control circuit to control the lockup clutch to full engagement if the rotational speed of the pump is not within the second threshold value of the rotational speed of the turbine within a specified time duration after limiting the rotational speed of the engine to the rotational speed that is within an offset value of the rotational speed of the turbine.

20. The system of claim 11 wherein the instructions stored in the memory of the first control circuit include instructions that are executable by the first control circuit to control the lockup clutch to an initial lockup clutch activation value by controlling the lockup clutch to an initial lockup clutch pressure, and to control the lockup clutch to full engagement by controlling the lockup clutch to a maximum lockup clutch pressure.

* * * * *